United States Patent
Asada

(10) Patent No.: US 7,015,594 B2
(45) Date of Patent: Mar. 21, 2006

(54) VEHICLE-MOUNTED ELECTRIC GENERATOR CONTROL SYSTEM WHICH SELECTIVELY SUPPLIES REGENERATIVE FIELD CURRENT TO BATTERY IN ACCORDANCE WITH CURRENTLY AVAILABLE GENERATING CAPACITY

(75) Inventor: Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/194,626

(22) Filed: Aug. 2, 2005

(65) Prior Publication Data

US 2006/0022647 A1    Feb. 2, 2006

(30) Foreign Application Priority Data

Aug. 2, 2004  (JP)  .............................. 2004-225033

(51) Int. Cl.
*H02P 9/00*    (2006.01)
(52) U.S. Cl. .................... 290/40 R; 290/41; 290/40 A; 290/40 C; 290/40 D; 322/28
(58) Field of Classification Search ................ 290/40, 290/40 A, 40 C, 40 D, 40 R, 41; 322/28, 322/29
See application file for complete search history.

(56) References Cited

U.S. PATENT DOCUMENTS

| 6,326,702 | B1 * | 12/2001 | Yonekura et al. ......... 290/40 C |
| 6,664,651 | B1 * | 12/2003 | Kotre et al. .................. 290/29 |
| 6,784,563 | B1 * | 8/2004 | Nada ........................ 290/40 C |
| 6,836,027 | B1 * | 12/2004 | Lee .......................... 290/40 C |
| 6,900,618 | B1 * | 5/2005 | Maehara ...................... 322/28 |

FOREIGN PATENT DOCUMENTS

JP    A 62-203599    9/1987

* cited by examiner

*Primary Examiner*—Darren Schuberg
*Assistant Examiner*—Iraj A. Mohandesi
(74) *Attorney, Agent, or Firm*—Oliff & Berridge, PLC

(57) ABSTRACT

A control apparatus for a vehicle electric generator judges the currently available generating capacity of the generator and establishes a regenerative current mode of operation, utilizing an induced current of the field winding, only when the generating capacity is estimated to be below a predetermined level. The control apparatus also controls the conduction factor of a power transistor to adjust the average voltage applied to the field winding such as to prevent fluctuations in output current and generator torque that would otherwise occur at each changeover to/from the regenerative current mode.

11 Claims, 6 Drawing Sheets

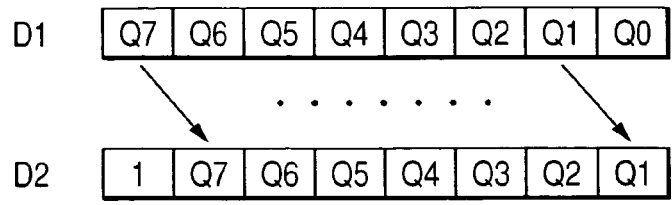
FIG. 10A  CHANGEOVER FROM BACK CURRENT MODE TO REGENERATIVE CURRENT MODE
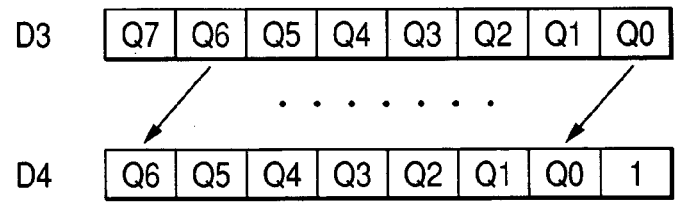
FIG. 10B  CHANGEOVER FROM REGENERATIVE CURRENT MODE TO BACK CURRENT MODE
FIG. 11
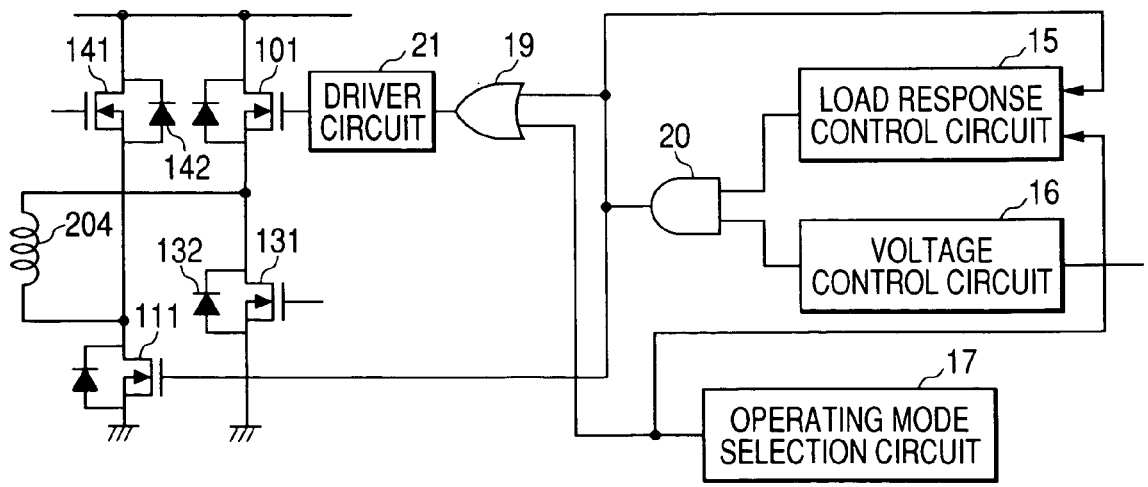

VEHICLE-MOUNTED ELECTRIC GENERATOR CONTROL SYSTEM WHICH SELECTIVELY SUPPLIES REGENERATIVE FIELD CURRENT TO BATTERY IN ACCORDANCE WITH CURRENTLY AVAILABLE GENERATING CAPACITY

CROSS REFERENCE TO RELATED DOCUMENT

This application is based on and incorporates herein by reference Japanese Patent Application No. 2004-225033 filed on Aug. 2, 2004.

BACKGROUND OF THE INVENTION

1. Field of Application

The present invention relates to an electric generator control apparatus for controlling the generated output of an electric generator of a motor vehicle.

2. Description of Prior Art

A motor vehicle is equipped with an electric generator, typically constituted as a 3-phase alternator that is driven by the vehicle engine, in combination with a rectifier circuit, to produce a DC output voltage for charging the vehicle battery and supplying an electrical load. The level of generator output voltage is controlled by varying a duty ratio of successive on/off switching (performed by a control apparatus, i.e., regulator) of a drive voltage applied to the field winding of the alternator rotor of the electric generator (referred to in the following simply as the field winding of the electric generator).

In recent years proposals have been made for utilizing an induced current that flows through the field winding at each switch-off of the drive voltage, as a regenerative current to be supplied to the battery. Conventionally, that induced field current has been dissipated by flowing back into the field winding through a diode, with such a type of operation being referred to in the following as a back current mode.

Japanese patent publication No. 62-203599 (pages 2–4, FIGS. 1–3), referred to in the following as reference document 1, describes an example of utilizing that induced field current as a regenerative current. Reference document 1 describes a vehicle electric generator control apparatus having an electric bridge circuit with two opposing arms formed of diodes and the remaining two opposing arms formed of power transistors (where the term "opposing arms" of a bridge circuit, as used herein, signifies two arms which do not have a common junction), and with two opposing junctions of the arms being connected across the battery and the remaining opposing junctions being connected across the field winding. Control of the average voltage applied to the field winding is performed by varying the duty ratio of synchronized on/off switching of the power transistors, and the current induced in the field winding at each switch-off passes through the diodes into the battery, as a regenerative current. Such an on/off switching control arrangement is sometimes referred to as a "transistor chopper" system.

However with the apparatus of reference document 1, the supplying of the regenerative current to the battery is performed irrespective of the generating condition of the electric generator. As a result, when the electric generator has a high level of available generating capacity (i.e., the vehicle engine is running at high speed) and the load on the electric generator is low, so that the battery has attained a substantially fully charged state, the battery will be incapable of absorbing the regenerative current as a charging current. In that condition, each time switch-off of the power transistors occurs, electrical noise in the form of a voltage spike will be produced at the battery supply terminal (generally referred to as the B terminal), as a sudden flow of regenerative current augments the output current from the electric generator. These noise spikes are transferred through wiring that is connected from the battery to various parts of the vehicle electrical system. Hence, such noise spikes can damage or cause malfunctioning of the electric generator or other electronic equipment of the vehicle.

As a countermeasure against this problem, it has been proposed in the prior art to configure such an electric generator control apparatus to be capable of being changed over between:

(a) a control mode in which the induced current of the field winding, at each switch-off of the power transistors of the bridge circuit, is passed directly back into the field winding (through a diode), i.e., a back current mode, and (b) a control mode in which the induced current of the field winding, at each switch-off of the power transistors of the bridge circuit, is passed into the battery, as a regenerative current, with such a mode being referred to in the following as a regenerative current mode.

However the relationship between the average voltage that is applied to the field winding and the duty ratio of the successive on/off switching of the power transistors of the bridge circuit, is found to differ in accordance with whether the back current mode or the regenerative current mode is established. As a result, each time there is a changeover between these two modes, an abrupt change may occur in the average voltage that is applied to the field winding. This will result in corresponding abrupt changes in the output current of the generator and in the level of generator torque (the amount of torque that must be applied by the vehicle engine to drive the rotor of the generator). Such abrupt changes in torque are particularly undesirable, since they can result in unstable running of the vehicle engine when it is operating at low speed, e.g., when idling.

With present-day types of electric generator control system for vehicles, instead of simply determining the duty ratio for on/off switching of the power transistors based on an error between the output voltage of the electric generator and a target value (to thereby adjust the field current in accordance with changes in generator load), appropriate values for the duty ratio are selectively read out (i.e., based on the aforementioned error) from a memory. These values are predetermined such as to prevent abrupt changes in the average voltage applied to the field winding, with conventional (i.e., back current mode) control, and so prevent sudden changes in the level of output current of the electric generator and abrupt variations in the generator torque. However such abrupt changes will still occur at each changeover between the back current mode and the regenerative current mode, as described above.

Due to the above-described disadvantages of electrical noise and sudden changes in generator torque, an electric generator control apparatus utilizing a "transistor chopper" type of bridge circuit, enabling regenerative operation as described above, has not come into widespread use, in spite of the advantage of increased efficiency of electrical generation that can be achieved through regenerative operation.

SUMMARY OF THE INVENTION

It is an objective of the present invention to overcome the disadvantages of the prior art described above, by providing an electric generator control apparatus for an electric generator of a motor vehicle whereby a regenerative current can be supplied from the field winding of the electric generator to the vehicle battery, but whereby generation of electrical (spike) noise resulting from supplying of the regenerative current is suppressed, and whereby abrupt changes in the output current of the electric generator and in the generator torque, occurring at timings of changeover to/from a regenerative current supply mode, are prevented.

To achieve the above objective, the invention provides an electric generator control apparatus for controlling a vehicle-mounted electric generator, with the generator having an output terminal connected to a battery and an electrical load, the apparatus including a bridge circuit coupled between the voltage supply terminal and a field winding of the electric generator, with the bridge circuit having a first pair of opposing arms comprising respective diodes and a second pair of opposing arms comprising respective power transistors, and with the generator control apparatus including operating mode selector means for selectively establishing a back current mode and a regenerative current mode of operation. In the back current mode, a first one of the power transistors is held continuously in the on (i.e., conducting) state and a second one of the power transistors is repetitively switched between the on state, for applying a drive voltage to the field winding, and an off (i.e., non-conducting state), for disconnecting the drive voltage from the field winding. As a result, current that is induced in the field winding at each timing of disconnection from the drive voltage is passed through the bridge circuit to be returned directly to the field winding. In the regenerative current mode, on/off switching of the first and second power transistors is performed in synchronism, such that that the induced field current is passed through the bridge circuit, as a regenerative current, into the battery.

Such an electric generator control apparatus according to the present invention is characterized in comprising generation capacity judgement means for estimating a currently available electrical generating capacity of the electric generator, and in that the operating mode selector means selects the regenerative current mode only when the results of judgement by the generation capacity judgement means indicate that the electrical generating capacity is below a predetermined level.

That is to say, the regenerative current mode is selected only when the electric generator is operating in a condition whereby:

(a) there is a need to maximize the output current that can be supplied by the electric generator to charge the battery and to supply the electrical load, and also (b) the battery will readily absorb a charging current supplied from the electric generator, without a significant change in the terminal voltage of the battery occurring in response to sudden increases in that charging current (i.e., as occur each time that the drive voltage of the field winding is interrupted, and a regenerative current begins to flow to the battery). Hence, electrical noise (i.e., voltage spikes) will not be generated (superimposed on the supply voltage from the battery/generator) as a result of the regenerative current flows, which could damage or interfere with the electric generator and/or various electronic equipment of the vehicle.

In practice, the electrical generating capacity judgement means can be implemented simply as a circuit which detects the speed of rotation of the rotor of the electric generator, i.e., with it being judged that the electrical generating capacity is at a low level when the speed of rotation is found to be below a predetermined speed. In the case of a usual type of electric generator based on an alternator, that judgement can be readily performed by monitoring the frequency of the AC output of the alternator, so that no additional components (i.e., sensors) are required, and hence the apparatus can have a simple and compact configuration.

However an apparatus according to the present invention could equally utilize a current sensor which detects the level of output current of the electric generator, or the level of charging current of the battery, with the electrical generating capacity being estimated based on the detected level of current. In practice, with a modern motor vehicle, such a current sensing function (e.g., for supplying information to an engine ECU, etc.) will in general already be incorporated in the vehicle electrical system, so that it is probable that no additional component would be required to implement the electrical generating capacity judgement function.

Furthermore, in place of utilizing two power transistors and two diodes, i.e., two different types of circuit device, it is possible to utilize four transistors, each configured as a double-diffusion type of MOS (Metal-Oxide Semiconductor) FET (field effect transistor) having a body diode. In that case, the aforementioned first and second power transistors would be implemented as two of these FETs, and the two diodes would be implemented as respective body diodes of the other two FETs. Such a configuration can enable the external control apparatus to be readily formed in an IC (integrated circuit) that is compact in size and inexpensive to manufacture.

From another aspect, a generator control apparatus according to the present invention preferably comprises conduction factor modification means, for modifying the conduction factor of the second power transistor (specifically, by modifying the duty ratio of a PWM signal which controls that power transistor) at each occurrence of changeover between the back current and regenerative current modes. The apparatus preferably performs the modification of the conduction factor such as to reduce an extent of variation of the average value of drive voltage applied to the field winding, by increasing the conduction factor at each changeover from the back current mode to the regenerative current mode and decreasing the conduction factor at each changeover from the regenerative current mode to the back current mode.

In that way, it becomes possible to suppress sudden changes in the average level of the drive voltage that is applied to the field winding by the second power transistor, and sudden changes in the level of generator torque which result, as described above, from a difference between the relationship of the average drive voltage of the field winding to the duty ratio of a PWM signal that controls the second power transistor, for the case of the back current mode being applied and the case of the regenerative current mode being applied, respectively. Thus, the invention ensures that stable levels of output current of the electric generator, and stable generator torque, can be maintained. Sudden increases in the torque that must by supplied by the engine to drive the generator are thereby prevented, so that stable idling operation of the engine can be achieved.

Designating D1 as a value of the conduction factor immediately prior to a changeover from the back current mode to the regenerative current mode, and designating D2 as a value established for the conduction factor immediately subsequent to a changeover from the back current mode to the regenerative current mode, the conduction factor modification means preferably performs the conduction factor modification at the changeover by utilizing the conversion relationship:

$$D2=(D1+1)/2.$$

In addition, designating D3 as a value of the conduction factor immediately prior to a changeover from the regenerative current mode to the back current mode, and designating D4 as a value established for the conduction factor immediately subsequent to the changeover from the regenerative current mode to the back current mode, the conduction factor modification means preferably performs the conduction factor modification at the changeover by utilizing the conversion relationship:

$$D4=2\times D3-1.$$

Conversion calculations to respectively establish these values D2, D4 can be performed in a simple manner by expressing the value of the conduction factor as a set of n bits of data, where n is a fixed integer, and performing a bit shift operation on these n bits at each changeover between the back current and regenerative current modes, with an updated value for the conduction factor being thereby established based on the result of the bit shift operation.

Hence, the conduction factor modification means can perform such conversions at high speed, but with only a small size of circuit being required.

BRIEF DESCRIPTION OF THE DRAWINGS

FIGS. 10A and 10B are diagrams for illustrating an arrangement for performing duty ratio conversion by utilizing bit shift operations; and FIG. 11 is a partial circuit diagram of an alternative configuration of the embodiment, in which MOS FETs are utilized in place of diodes in a field winding drive circuit.

DESCRIPTION OF PREFERRED EMBODIMENTS

Figure 1:
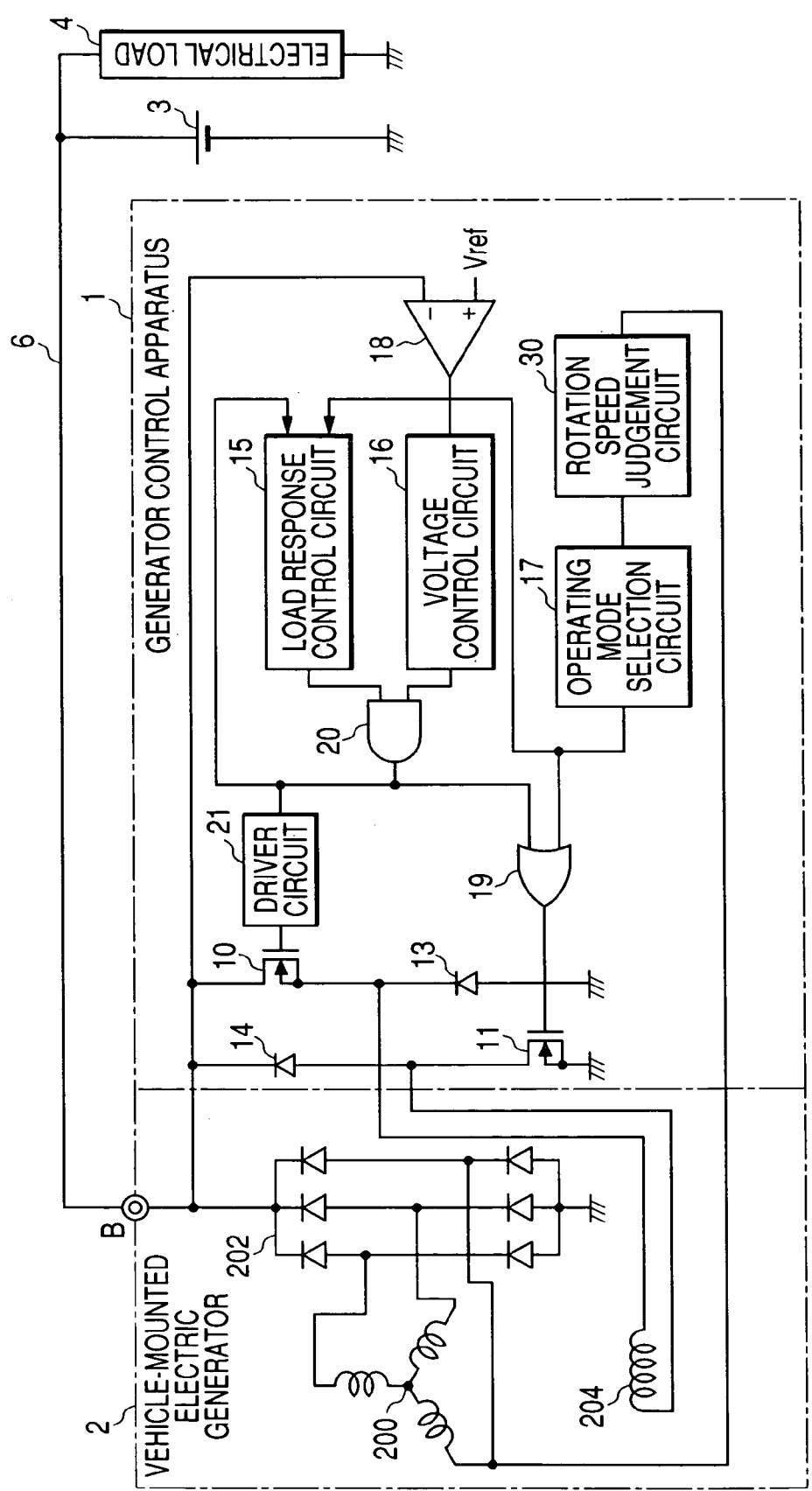
FIG. 1 shows the general system configuration of an embodiment of an electric generator control apparatus.

A first embodiment of a generator control apparatus will be described referring to the general system diagram of FIG. 1. This shows the connection relationships between the generator control apparatus, designated by reference numeral 1, and a vehicle-mounted electric generator (referred to in the following simply as generator) 2, a battery 3 and an electric load 4. Basically, the electric generator control apparatus 1 (referred to in the following simply as the generator control apparatus 1) applies control to the generator 2 for bringing the voltage appearing at the positive output terminal of the generator 2 (designated as the B terminal) into coincidence with an adjustment value, indicated as Vref in FIG. 1. Typically, the adjustment value is approximately 14 V.

The generator 2 is made up of a 3-phase alternator having a stator winding 200 and a rotor (not shown in the drawings) having a field winding 204 wound thereon, and a full-wave rectifier 202 which rectifies the 3-phase AC output voltages from the stator winding 200, to supply an output DC voltage to the B terminal. The rotor is driven by a vehicle engine (not shown in the drawings). The generator control apparatus 1 performs control of on/off switching of the field current of the field winding 204, with a duty ratio of the switching determining the level of AC voltage generated in the generator 2, and so determining the level of DC output current supplied by the generator 2 from an output terminal designated as the B terminal. That output current is supplied via a connecting lead 6 to the battery 3 and the electrical load 4, for recharging the battery 3 and driving the electrical load 4.

The configuration of the generator control apparatus 1 will be described in more detail in the following. The generator control apparatus 1 includes a pair of power transistors, i.e., MOS FETs (Metal-Oxide Semiconductor Field Effect Transistors) 10, 11, which are connected in a bridge configuration in conjunction with a pair of diodes 11, 13 as shown. The generator control apparatus 1 further includes a load response control circuit 15, a voltage control circuit 16, an operating mode selection circuit 17, a voltage comparator 18, an OR gate 19, an AND gate 20, a driver circuit 21, and a rotation speed judgement circuit 30. The MOS FET 11 and diode 14 are connected in series between the B terminal of the generator 2 and the system ground potential, and the diode 13 and MOS FET 10 are similarly connected in series, with the field winding 204 being connected between the junction of the diode 14 and MOS FET 11, and the junction of the MOS FET 10 and diode 13, with a voltage being thereby applied to the field winding 204 when the MOS FET 10 conducts. The average value of that voltage, and hence the level of field current of the field winding 204, is determined by the duty ratio of PWM (Pulse Width Modulation) control that is effected by on/off switching of the MOS FET 10 (i.e., switching of the MOS FET 10 between the conducting state and non-conducting states), performed by the driver circuit 21.

Each time the MOS FET 10 is switched to the off state, an induced current of the field winding 204 flows either:

(a) (when the MOS FET 11 is in the off state) through the pair of arms of the bridge circuit that are respectively constituted by the diodes 13, 14, as a regenerative current that is supplied to the battery 3, or (b) (when the MOS FET 11 is in the on state) through the pair of arms of the bridge circuit that are respectively constituted by the MOS FET 11 and the diode 13, as a back flow of current that returns directly to the field winding 204.

The operation of case (a) above will be referred to as the regenerative current mode, while that of case (b) above will be referred to as the back current mode.

The voltage comparator 18 compares the output voltage of the generator 2 with the adjustment value Vref, and produces a high-level output signal when the output voltage of the generator 2 is lower than Vref and produces a low-level output signal when the output voltage of the generator 2 is higher than Vref, with that output signal from the voltage comparator 18 being inputted to the voltage control circuit 16. The voltage control circuit 16 produces a PWM control signal for controlling the switching of the MOS FET 10, in accordance with the output signal from the voltage comparator 18.

Various configurations are possible for the voltage control circuit 16. As a simple example, the voltage control circuit 16 could be configured of a low-pass filter for smoothing the output signal from the voltage comparator 18, a sawtooth-waveform generating circuit, and a voltage comparator for comparing the waveform of the smoothed output signal from the voltage comparator 18 with a sawtooth-waveform signal, to thereby generate a PWM signal which would be applied via the AND gate 20 to the driver circuit 21.

With this embodiment, the MOS FET 10 functions as a high-side switch, which is driven by a PWM signal produced from the driver circuit 21 in response to the output from the AND gate 20. Specifically, during each interval in which the output signal from the AND gate 20 is at the high level (i.e., a high logic level potential), the driver circuit 21 sets the MOS FET 10 in the on state, while otherwise the MOS FET 10 is set in the off state.

The output signal from the AND gate 20 is also supplied to one input of the OR gate 19. The output signal from the OR gate 19 controls the MOS FET 11, which functions as a low-side switch, being set in the on state during each interval in which the output signal from the OR gate 19 is at the high level, and being otherwise held in the off state.

The load response control circuit 15 has a PWM modification function, as described in the following. When the level of the electrical load 4 suddenly increases, the load response control circuit 15 applies load response control, by effecting control whereby the field current of the 204 is increased only gradually in response to the sudden increase in load. That is to say, when the electrical load 4 suddenly increases, so that the B terminal voltage abruptly falls, and the output signal from the voltage comparator 18 goes to the low level (and remains at that level until the B terminal voltage returns to the adjustment value Vref), the load response control circuit 15 generates an output signal that is combined (in the AND gate 20) with the PWM output signal from the voltage control circuit 16, whereby the duty ratio of the PWM output signal from the AND gate 20 increases only gradually. In that way, abrupt increases in the output current produced by the generator 2, and abrupt increases in the generator torque, can be prevented.

The function of the rotation speed judgement circuit 30 is to judge the currently available electrical generating capacity of the generator 2. With this embodiment, this judgement is based upon the speed of rotation of the rotor of the generator 2 (referred to in the following simply as the speed of rotation of the generator 2). Specifically, the rotation speed judgement circuit 30 detects the frequency of one of the phases of the phase winding 200, to thereby determine the speed of rotation of the generator 2, and is configured to produce an output signal at the low level (i.e., indicating that the available electrical generating capacity is relatively low) when the speed of rotation of the generator 2 is lower than a predetermined reference value and at the high level (i.e., indicating that the available electrical generating capacity is relatively high) when the speed of rotation is equal to or greater than the reference value. The reference speed value corresponds to a speed of rotation of the vehicle engine that is slightly higher than the idling speed.

The output signal thereby produced from the rotation speed judgement circuit 30 is inputted to the operating mode selection circuit 17. The operating mode selection circuit 17 performs a selection function, for selectively establishing the aforementioned back current mode and regenerative current mode. Specifically, when the output signal from the rotation speed judgement circuit 30 is at the high level, indicating that the electrical generating capacity is high, the operating mode selection circuit 17 supplies a high level signal to the second input of the 2-input OR gate 19, which thereby produces a high level output signal that holds the MOS FET 11 continuously in the on state. The end of the field winding 204 that is connected to the junction of the diode 14 and the MOS FET 11 is thereby clamped at ground potential, so that the back current mode is established, i.e., with current flowing through the MOS FET 11 and diode 13 back into the field winding 204 each time the MOS FET 10 is switched to the off state.

Conversely, when the output signal from the rotation speed judgement circuit 30 is at the low level, indicating that the available electrical generating capacity is low, the operating mode selection circuit 17 supplies a low level signal to the second input of the 2-input OR gate 19, which thereby produces a high level output signal only when the output of the AND gate 20 goes to the high level. As a result synchronous on/off switching of the MOS FETs 10, 11 is performed by the output signal from the AND gate 20, so that a regenerative current flows from the field winding 204 via the diodes 13, 14 to the B terminal, i.e., to the battery 3, during each interval in which the MOS FETs 10, 11 are in the OFF state. Thus, the regenerative current mode is established.

Figure 2:
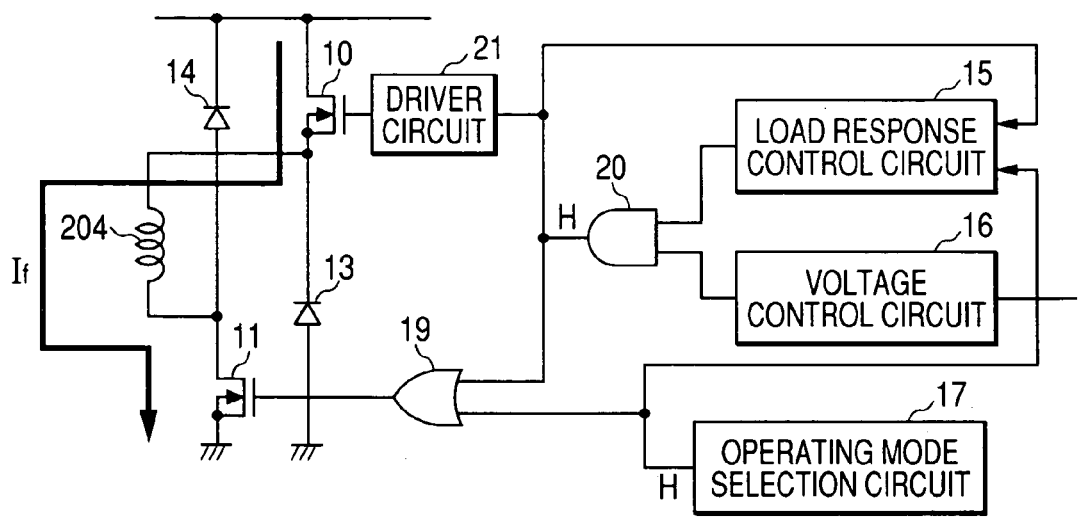
FIG. 2 is a partial system diagram for illustrating the flow path of field current of the embodiment when a drive voltage is applied to a field winding.
Figure 3:
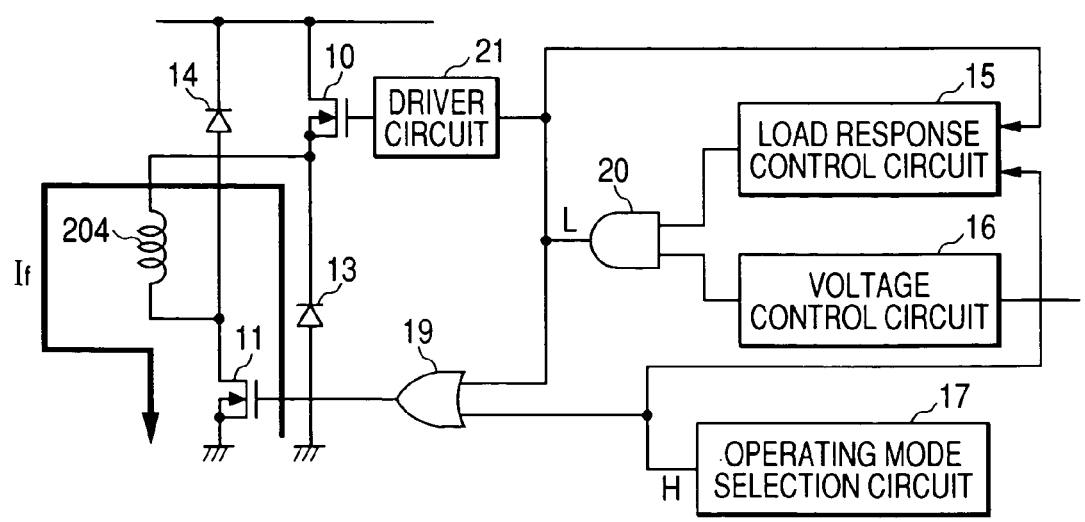
FIG. 3 is a partial system diagram for illustrating the flow path of field current that is induced in the field winding when the drive voltage is interrupted, with the apparatus operating in a back current mode.
Figure 4:
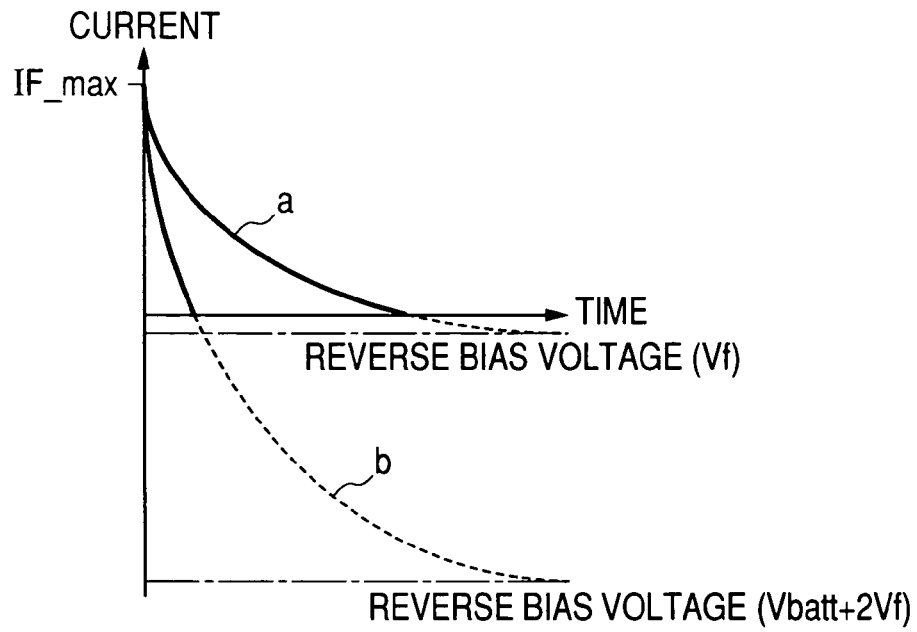
FIG. 4 illustrates the variation of field current with time, immediately after the drive voltage is interrupted, for the case of operation in the back current mode and in a regenerative current mode respectively.
Figure 5:
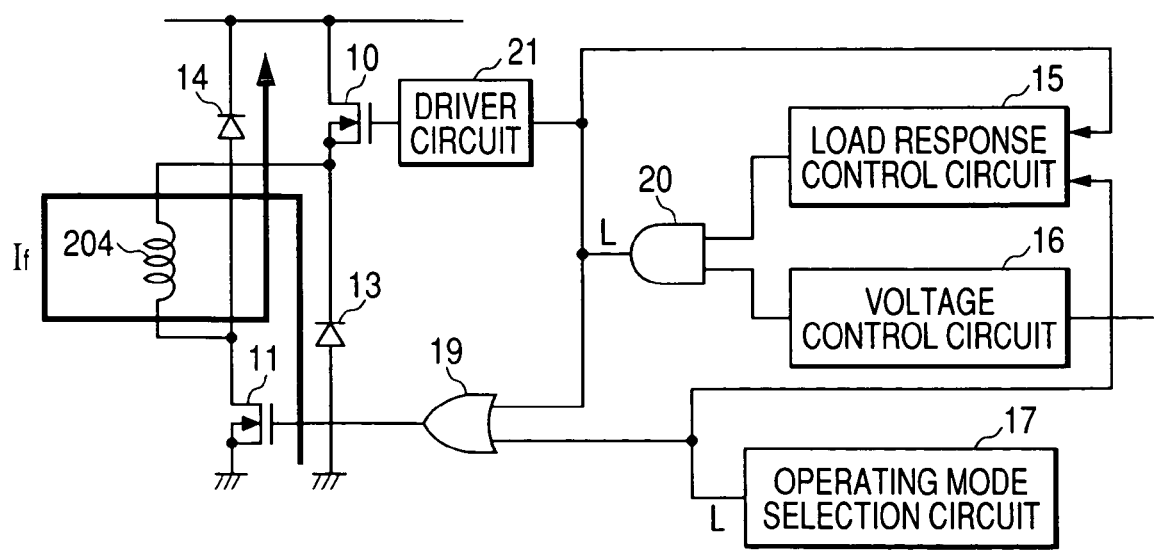
FIG. 5 is a partial system diagram for illustrating the flow path of field current that is induced in the field winding when the drive voltage is interrupted, with the apparatus operating in the regenerative current mode.

The above can be summarized as follows, referring to FIGS. 2 to 5. In these, FIG. 2 illustrates the flow path of current through the generator 2, in the regenerative current mode and in the back current mode, during each interval in which the MOS FET 10 is set in the on state. FIG. 3 illustrates the flow path of current through the generator 2 in the back current mode, after the MOS FET 10 is set in the off state. FIG. 5 illustrates the flow path of current through the generator 2 in the regenerative current mode, after the MOS FET 10 is set in the off state. FIG. 4 illustrates the manner of variation of the amplitude of current flow through the generator 2, immediately after the MOS FET 10 is set in the off state, for the case of operation in the back current mode and the regenerative current mode respectively.

Operation in Back Current Mode

When the vehicle begins to be driven, and the speed of rotation of the generator 2 becomes higher than the reference speed value, indicating that there is a sufficient available electrical generating capacity, a high level signal becomes outputted from the rotation speed judgement circuit 30, which is applied through the OR gate 19 to the MOS FET 11, whereby the MOS FET 11 is held continuously in the on state, and the back current mode is established. In this condition, each time that the PWM signal from the AND gate 20 goes to the high level, so that the MOS FET 10 is set in the on state, field current (indicated as If in FIGS. 2 to 5) flows successively through the MOS FET 10, the field winding 204 and the MOS FET 11. Each time that the PWM signal from the AND gate 20 goes to the low level, so that the MOS FET 10 is set in the off state and the voltage applied to the field winding 204 is removed, a potential difference that is of opposite polarity to the applied voltage (referred to in the following as the reverse bias voltage) is induced in the field winding 204, and a resultant induced field current If flows successively through the diode 13, the field winding 204, and the MOS FET 11 as illustrated in FIG. 2. This "back current" flow begins (at switch-off of the MOS FET 10) when the reverse bias voltage of the generator 2 exceeds the forward conduction voltage drop Vf of the diode 13, and continues until the potential difference across the generator 2 falls below Vf. The time constant of each such occurrence of back current flow is approximately 100 to 200 ms, and the variation of the field current If during such an interval is illustrated by curve "a" in FIG. 4.

Operation in Regenerative Current Mode

FIG. 5 illustrates the path of flow of the field current If following switch-off of the MOS FET 10, during operation in the regenerative current mode. As described above, this mode is entered when the speed of the generator 2 is below a predetermined value, indicating that the available electrical generating capacity of the generator 2 is low. In this case, the output signal from the AND gate 20 is transferred unchanged through the OR gate 19, to perform switching of the MOS FET 11 in synchronism with the MOS FET 10. Thus when the output signal from the AND gate 20 goes to the low level, both of the MOS FETs 10, 11 are set in the off state, so that an induced current of the field winding 204 flows via the path shown in FIG. 5, via the diode 13, the field winding 204 and the diode 14, and into the battery 3 as a regenerative current.

In this case, the flow of the regenerative current begins (immediately after switch-off of the MOS FETs 10, 11) when the reverse bias voltage of the field winding 204 exceeds the sum of the terminal voltage of the battery 3 (indicated as Vbatt in FIG. 4) and the respective forward conduction voltage drops Vf of the diodes 13 and 14. Hence, each flow of regenerative current has a short time constant, of approximately 20 to 40 ms. This is illustrated by the corresponding curve "b" in FIG. 4.

In that way, the generator control apparatus 1 establishes the regenerative current mode only when the available electrical generating capacity of the generator 2 is relatively low. In general, in that condition the battery 3 is capable of absorbing a high level of charging current without exhibiting a significant increase in its the terminal voltage. Thus, electrical noise in the form of spike noise is not generated as a result of the flow of regenerative current into the battery 3.

Figure 6:
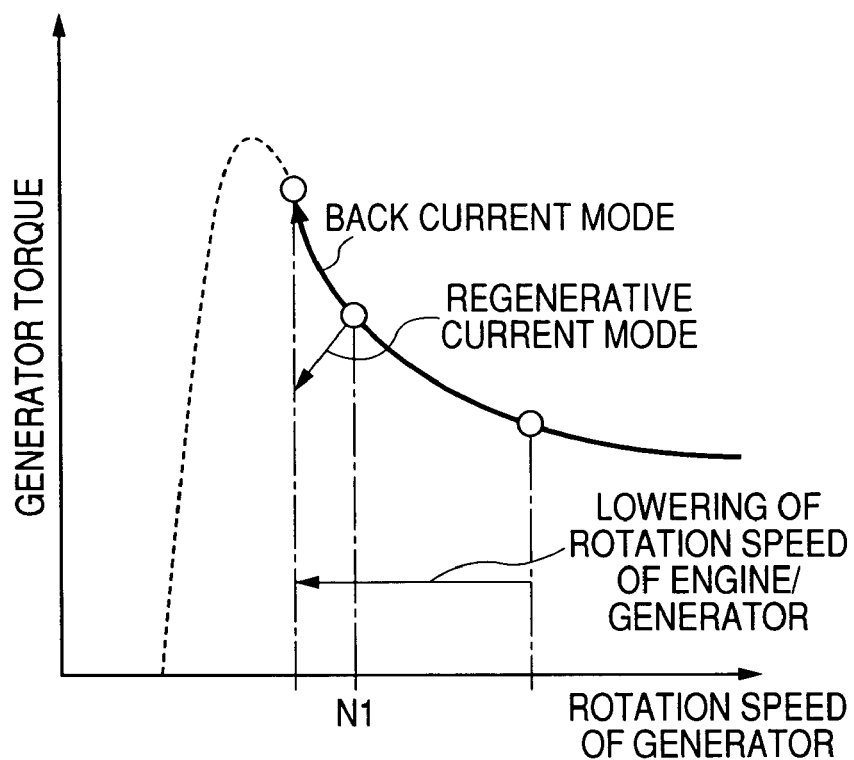
FIG. 6 is a diagram illustrating the relationship between speed of rotation of a rotor of an electric generator of the embodiment and generator torque.

With a conventional type of vehicle generator control apparatus, as the vehicle engine begins to run at a low speed then the field current is increased in order to compensate the output voltage of the generator for the reduced speed of rotation of the generator rotor, thereby resulting in an increase in the generator torque. However with this embodiment of the invention, when the speed of rotation of the generator rotor falls below a predetermined value, the regenerative current mode is entered, whereby the generator torque is immediately decreased, while maintaining the output voltage of the generator at the required value. This is illustrated in the graph of FIG. 6, showing the relationship between generator torque and the generator speed of rotation, with the reference speed value at which the regenerative current mode is entered being designated as N1. Sudden increases in generator torque, when the engine speed of rotation drops, can thus be prevented, and stable idling operation of the engine can thereby be achieved.

With this embodiment, it is assumed that when generator speed of rotation is at the reference speed value, corresponding to an engine speed that is slightly higher than the idling speed, there is a balance between the generated output power of the generator 2 and the available electrical generating capacity, and that when the generator speed of rotation falls below the reference speed value, the electrical generating capacity has become insufficient, i.e., the judgement of electrical generating capacity is based only on the generator speed of rotation. However it would be equally possible to utilize some other arrangement for estimating the electrical generating capacity, for example by using a current sensor for measuring the level of output current of the generator 2, or the level of charging current of the battery 3, and judging the available electrical generating capacity based on the results of such current measurement.

Furthermore, instead of using a dedicated circuit such as the rotation speed judgement circuit 30 to detect the generator speed of rotation, it would be equally possible to utilize vehicle engine speed information (e.g., supplied from a device which is external to the generator control apparatus 1, such as an engine ECU that utilizes engine speed information from a sensor) for detecting the generator speed of rotation based upon the engine speed, and thereby judging whether the electrical generating capacity of the generator 2 is sufficient.

The operation of the load response control circuit 15 will be described in the following. While the electrical load 4 is in a stable condition, the voltage control circuit 16 performs PWM switching control of the MOS FET 10, to control the drive current of the field winding 204. Output patterns for that PWM signal from the voltage control circuit 16 are stored beforehand in a memory (not shown in the drawings) of the load response control circuit 15. If the terminal voltage of the battery 3 becomes reduced, then although the duty ratio of the PWM output signal from the voltage control circuit 16 will thereby be immediately increased, the duty ratio of a PWM output signal produced from the load response control circuit 15 will only gradually increase, so that the output PWM signal from the AND gate 20 will accordingly increase only gradually. Hence, the output current of the generator 2 will only gradually increase, so that the generator torque will not suddenly increase. In that way, the load response control circuit 15 serves to suppress sudden increases in the load torque applied to the engine by the generator 2 when the engine speed is lowered, so that stable engine idling can be achieved.

However if such load response control is directly applied, a problem arises in that the relationship between the duty ratio of the PWM signal outputted from the AND gate 20 and the actual average voltage that is applied to the field winding 204 will differ in accordance with whether the regenerative current mode or the back current mode is established.

Figure 7:
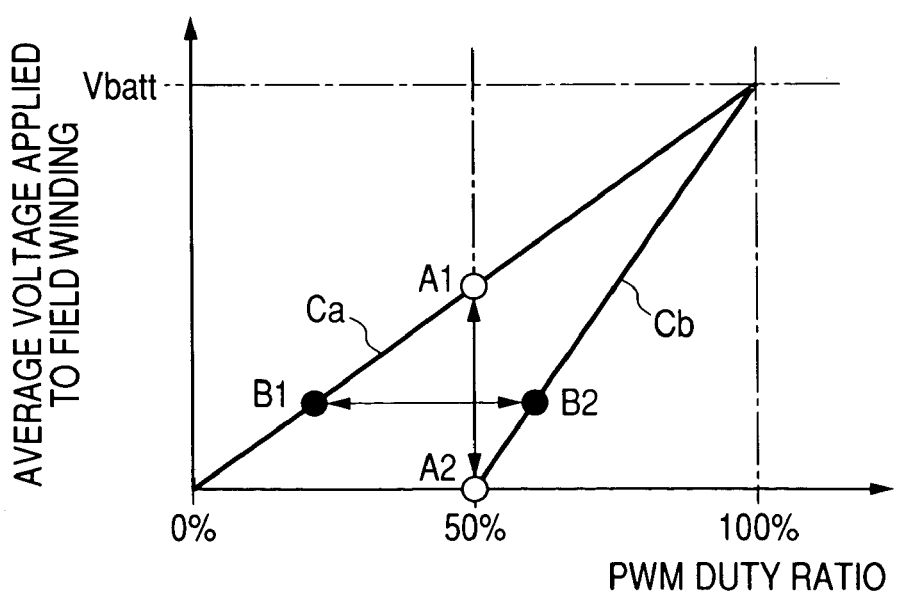
FIG. 7 is a diagram illustrating the relationship between values of duty ratio of a PWM signal used to control the average voltage applied to the field winding and corresponding values of average voltage, for the case of operation in the back current mode and in the regenerative current mode respectively.

FIG. 7 illustrates these respective relationships between PWM duty ratio of the output signal from the AND gate 20 and the output voltage of the generator 2 (more specifically, the peak AC voltage of the stator winding 200), with the output voltage expressed as the corresponding average value of voltage applied to the field winding 204, with the relationship for the case of the back current mode designated as Ca and that for the case of the regenerative current mode designated as Cd. Assuming that the system is operating in the regenerative current mode under a relatively light value of electric load 4, corresponding to the point A2 in FIG. 7, if changeover to the back current mode is then performed with the duty ratio of the PWM signal from the AND gate 20 left unchanged, then the generator output voltage will suddenly increase to a value corresponding to the point A1 in FIG. 7. The output current of the generator 2 will thereby abruptly increase, and the generator torque will thus suddenly increase unnecessarily. Adverse effects may thereby occur, such as irregular running of the engine, and a sudden increase in the terminal voltage of the battery 3 due to an increased level of charging current, which can affect various electronic components of the vehicle.

However the load response control circuit 15 of this embodiment applies countermeasures to prevent occurrence of such problems.

Figure 8:
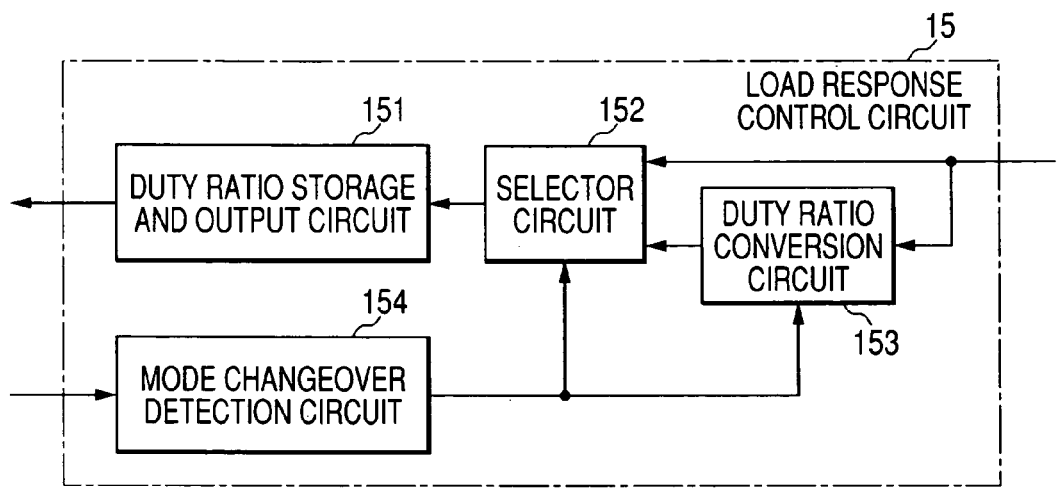
FIG. 8 is a block diagram showing the basic configuration of a load response control circuit of the embodiment.
Figure 9:
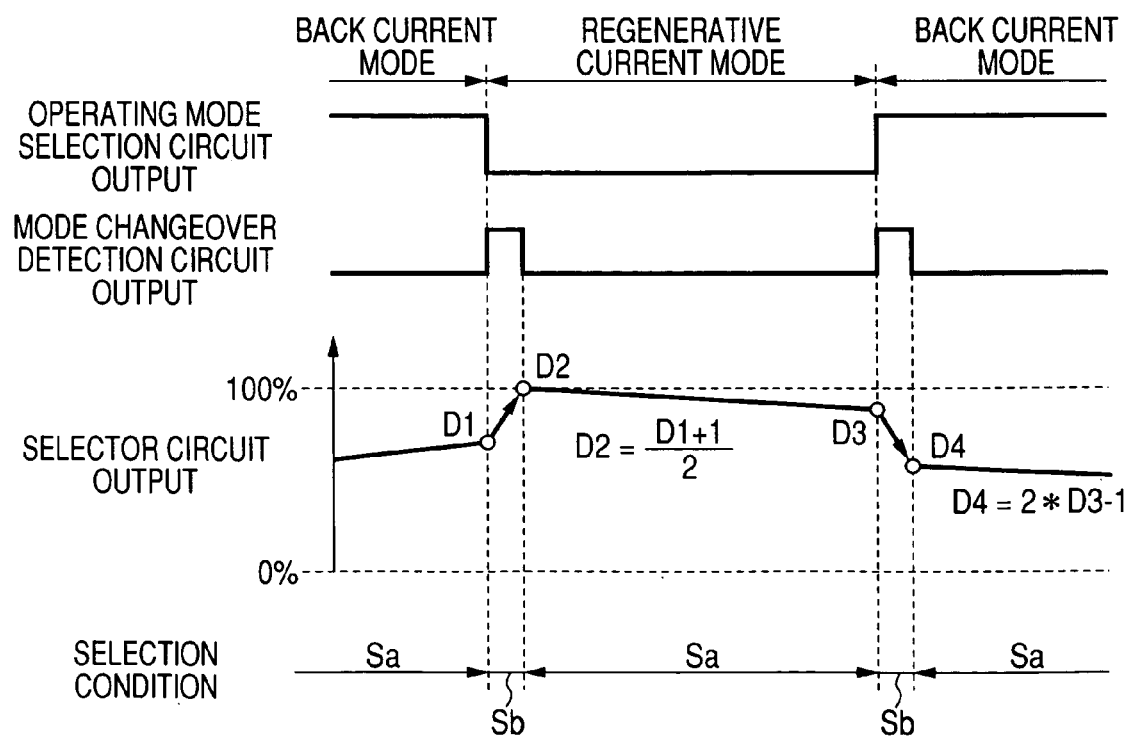
FIG. 9 is a diagram for use in describing the operation of the load response control circuit.

FIG. 8 shows details of the configuration of the load response control circuit 15, which as shown is made up of a duty ratio storage and output circuit 151, a selector circuit 152, a duty ratio conversion circuit 153 and a mode changeover detection circuit 154. The mode changeover detection circuit 154 receives the output signal from the operating mode selection circuit 17, while the PWM output signal from the AND gate 20 is inputted to the selector circuit 152 and duty ratio conversion circuit 153. In addition, an output signal from the duty ratio conversion circuit 153 is inputted to the selector circuit 152, and an output signal from the mode changeover detection circuit 154 is inputted to each of the selector circuit 152 and duty ratio conversion circuit 153. FIG. 9 is a timing diagram for describing the operation of the load response control circuit 15. The mode changeover detection circuit 154 detects each occurrence of changeover from the back current mode to the regenerative current mode (i.e., when the output signal from the operating mode selection circuit 17 changes from the high level to the low level as shown in FIG. 9), or from the regenerative current mode to the back current mode (i.e., when the output signal from the operating mode selection circuit 17 changes from the low level to the high level), and produces a high level output signal during a fixed time interval that begins when such a changeover occurs.

The selector circuit 152 selects one of the two input signals supplied thereto, in accordance with the level of the output signal from the mode changeover detection circuit 154. Specifically, when a mode changeover is detected, so that the output from the mode changeover detection circuit 154 goes to the high level, the input signal supplied to the selector circuit 152 from the duty ratio conversion circuit 153 is selected, while otherwise the input signal supplied from the AND gate 20 is selected to be outputted from the selector circuit 152.

The duty ratio conversion circuit 153 performed conversion of the duty ratio of the PWM signal from the AND gate 20 in accordance with whether the back current mode or the regenerative current mode is established, as described hereinafter. The duty ratio storage and output circuit 151 responds to the PWM signal that is inputted from the selector circuit 152 by producing an output PWM signal having a duty ratio that is slightly greater than that of the PWM signal from the selector circuit 152.

In FIG. 9, each interval in which the PWM signal inputted from the AND gate 20 is selected by the selector circuit 152 is indicated as a selection status Sa interval, while each interval in which the PWM signal inputted from the duty ratio conversion circuit 153 is selected by the selector circuit 152 is indicated as a selection status Sb interval.

As illustrated in FIG. 9, when changeover is performed from the back current mode to the regenerative current mode, the output signal from the operating mode selection circuit 17 changes from the high level to the low level, and the output signal from the mode changeover detection circuit 154 then goes to the high level and remains at that level for a fixed time interval (i.e., a selection status Sb interval). During that interval, the duty ratio conversion circuit 153 converts the duty ratio D1 of the PWM signal inputted from the AND gate 20 to produce an output PWM signal having a duty ratio D2, where:

$$D2=(D1+1)/2 \qquad (1)$$

In the present description and in the appended claims, the duty ratio of the output PWM signal from the AND gate 20 and the conduction factor of the MOS FET 10 are assumed to be mutually identical.

Conversely, when changeover is performed from the regenerative current mode to the back current mode, the output signal from the operating mode selection circuit 17 changes from the low level to the high level, and the output signal from the mode changeover detection circuit 154 then goes to the high level and remains at that level for a fixed time interval (i.e., a selection status Sb interval). During that interval, the duty ratio conversion circuit 153 converts the duty ratio D3 of the PWM signal inputted from the AND gate 20 to produce an output PWM signal having a duty ratio D4, (i.e., to establish a conduction factor D4 for the MOS FET 10) where:

$$D4=2 \times D3-1 \qquad (2)$$

In the above expressions for D2 and D4, it will be understood that a value of 1 for the duty ratio (conduction factor) corresponds to 100%, expressed as a percentage.

By utilizing the duty ratio conversion circuit 153 in that way, and supplying the PWM signal thus produced to one of the inputs of the AND gate 20, it can be ensured that the duty ratio of the PWM signal that is outputted from the AND gate 20 will not vary such as to cause abrupt large-scale changes in the output current of the generator 2 when transitions occur between operation in the back current mode and in the regenerative current mode. Hence, a stable level of output voltage from the generator 2 can be achieved, and sudden changes in the generator torque can be avoided.

It will be assumed in the following that a set of eight data bits designated as Q0 to Q7 are used to express a duty ratio value by the duty ratio conversion circuit 153, such that when these bits Q0 to Q7 have the respective values 00000000 the duty ratio is 0% and when bits Q0 to Q7 have the respective values 11111111 the duty ratio is 100%. In that case as illustrated in FIG. 10A, when changeover from the back current mode to the regenerative current mode is performed, it is only necessary to perform a 1-bit right shift operation on these 8 bits Q0 to Q7 and then insert the value 1 into the MSB (most significant bit) position, to thereby perform the calculation of expression (1) above.

Conversely as illustrated in FIG. 10B, when changeover from the regenerative current mode to the back current mode is performed, it is only necessary to perform a 1-bit left shift operation on the bits Q0 to Q7 and then insert the value 1 into the LSB (least significant bit) position, to thereby perform the calculation of expression (2) above.

In that way, it is only necessary for the duty ratio conversion circuit 153 to perform simple shift operations, e.g., on a set of bits held in a register, so that these operations can be rapidly performed with only a small-scale circuit being required.

With this embodiment, when the output power of the generator 2 is low in relation to the magnitude of the electrical load 4, so that the currently available electrical generating capacity is small, the regenerative current mode is entered, to supply reverse flows of field current to the battery 3 as regenerative current, so that power is more efficiently supplied to the electrical load 4. When the electrical generating capacity is small, the battery 3 will readily absorb a charging current, i.e., the battery terminal voltage will not change significantly when an increased amount of charging current is supplied. Thus, spike noise will not occur in the terminal voltage of the battery 3 as a result of the successive flows of regenerative current into the battery 3, so that damage to electronic components of the vehicle, or interference with the operation of these components or of the generator 2, will not arise due to excessive electrical noise.

Since the output power of the generator 2 increases as the speed of rotation rises, the currently available electrical generating capacity can be easily and reliably monitored by detecting that speed of rotation. This has the advantage of a simple configuration, without requiring the use of dedicated additional components such as a current sensor for directly measuring the level of output current from the generator 2, or a current sensor for measuring the level of charging current being supplied to the battery 3. However the invention is equally applicable to a system in which such a current sensor is utilized for judging the electrical generating capacity.

In particular, in the case of a vehicle electric system in which the level of output current from the generator 2, or the level of charging current being supplied to the battery 3 (or both of these) are already incorporated, for supplying such current level information to an engine ECU, the information provided by such an existing current sensor could be used for judging the electrical generating capacity of the generator 2, in place of monitoring the generator speed of rotation.

Furthermore as described above, it would be equally possible to utilize the speed of rotation of the vehicle engine in place of that of the generator, for judging the electrical generating capacity, particularly when such engine speed information is already available to an engine ECU, as will generally be the case with a modern motor vehicle.

As described above, the relationship between the conduction factor of the MOS FET 10 and the average voltage that is applied to the field winding 204 varies in accordance with whether the back current mode or the regenerative current mode is being applied. Thus, if a changeover is performed between these operating modes while the conduction factor of the MOS FET 10 is left unchanged, an abrupt change in the level of average voltage applied to the field winding 204 may occur. However with the above embodiment, the conduction factor of the MOS FET 10 is appropriately modified at each time of changeover between these operating modes, to eliminate such a problem. It is thereby ensured that abrupt increases will not occur in the output current of the generator 2 or in the generator torque, so that a condition of stable engine idling can be achieved.

In particular with the above embodiment, the conduction factor of the MOS FET 10 is modified (i.e., by modifying the duty ratio of the PWM signal which controls on/off switching of that transistor, and also of the MOS FET 11 in the case of the regenerative current mode) appropriately such as to maintain the average voltage applied to the field winding 204 at substantially the same level, to ensure stability of the level of output current from the generator 2 and of the generator torque.

Specifically, the conduction factor is increased at each transition from the back current mode to the regenerative current mode and is decreased at each transition from the regenerative current mode to the back current mode, to obtain the above effects.

Furthermore with the above embodiment, when changeover is performed from the back current mode to the regenerative current mode, the PWM duty ratio (conduction factor) is converted from a value D1 prior to the changeover to a value D2, where D2 is equal to (D1+1)/2, while when changeover is performed from the regenerative current mode to the back current mode, the PWM duty ratio is converted from a value D3 prior to the changeover to a value D4, where D4 is equal to (2×D3−1). By using such fixed relationships for performing calculations to convert the conduction factor at each changeover, the relationship between the conduction factor of the MOS FET 10 and the average voltage that is applied to the field winding 204 can be reliably converted in an appropriate direction, by an appropriate amount. In that way, abrupt changes in the level of output current from the generator 2 and in the level of generator torque can be prevented, so that stable engine idling operation can be maintained.

Moreover by expressing the duty ratio as a fixed number of n bits as described above, these conversions can be easily performed by simple bit shift operations applied to the n bits, and so can be rapidly effected without a large-scale circuit being necessary.

It should be noted that the invention is not limited to the above embodiment, and that various modifications could be envisaged. In particular, with the above embodiment, the average voltage of the field winding 204 is determined by PWM control of the MOS FET 10, which operates as a high-side switch within the bridge circuit formed of the MOS FETs 10, 11 and diodes 13, 14, while changeover between the back current mode and the regenerative current mode is performed using the MOS FET 11, which functions as a low-side switch in the bridge circuit. However it would be equally possible to employ the opposite arrangement, whereby the average voltage of the field winding 204 would be determined by PWM control of the low-side switch (i.e., the MOS FET 11 would be controlled by the output signal from the driver circuit 21) and whereby the operating mode changeover would be performed by controlling the MOS FET 10. This would have the advantage of enabling the drive output capability required for the driver circuit 21 to be reduced, so that the driver circuit 21 could be implemented by a smaller-scale circuit.

Furthermore with the above embodiment, diodes 13, 14 are utilized for passing the reverse flow of field current of the field winding 204 each time that the drive voltage of the field winding 204 is interrupted. However it would be equally possible to utilize the body diodes of MOS FETs in place of these diodes 13, 14, as illustrated in the partial system diagram of FIG. 11 which shows an alternative form of the first embodiment of FIG. 1 described above. Here, the MOS FETs 101, 111 correspond to the MOS FETs 10, 11 of the first embodiment, while MOS FETs 131, 141 are respectively utilized in place of the diodes 13, 14. Use of the body diodes of MOS FETs in this way has the advantage that each of the MOS FETs 101, 111, 131, 141 can be configured as a double-diffusion type of MOS FET, with each of these transistors having an identical cross-sectional configuration. This would enable the generator control apparatus 1 to be more readily manufactured as an integrated circuit that is compact in size and has low manufacturing cost.

What is claimed is:

1. An electric generator control apparatus for controlling an electric generator of a vehicle, the electric generator having a voltage supply terminal connected to a battery and an electrical load, the apparatus including a bridge circuit coupled between said voltage supply terminal and a field winding of said electric generator, with said bridge circuit having a first pair of opposing arms comprising respective diodes and a second pair of opposing arms comprising respective power transistors, said generator control apparatus further including operating mode selector means for selectively establishing
(a) a back current mode of operation wherein a first one of said power transistors is held continuously in an on state and a second one of said power transistors is repetitively switched between said on state, for applying a drive voltage to said field winding, and an off state, for disconnecting said drive voltage from said field winding, whereby an induced current which flows from said field winding during said off state is returned directly to said field winding, and
(b) a regenerative current mode of operation wherein synchronized on and off switching of said first and second power transistors is performed, whereby said induced current is passed as a regenerative current into said battery;
wherein
said electric generator control apparatus comprises generation capacity judgement means for judging a currently available electrical generating capacity of said electric generator, and
said operating mode selector means is responsive to said generation capacity judgement means for selecting said regenerative current mode when said electrical generating capacity is judged to be below a predetermined level.

2. A generator control apparatus according to claim 1, wherein said electrical generating capacity judgement means comprises rotation detection means for detecting a speed of rotation of a rotor of said electric generator, and wherein said electrical generating capacity is judged based upon said detected speed of rotation.

3. A generator control apparatus according to claim 2, wherein said electrical generating capacity judgement means judges that said electrical generating capacity is insufficient when said detected speed of rotation is below a fixedly predetermined reference value.

4. A generator control apparatus according to claim 1, wherein said electrical generating capacity judgement means comprises sensor means for detecting a level of output current of said electric generator, and wherein said electrical generating capacity is judged based on said detected level of output current.

5. A generator control apparatus according to claim 1, wherein each of said power transistors is a double-diffusion type of MOS (Metal-Oxide Semiconductor) field effect transistor having a body diode, and wherein each of said diodes of said generator control apparatus comprises a body diode of a transistor having an identical cross-sectional configuration to each of said power transistors.

6. A generator control apparatus according to claim 1, comprising conduction factor modification means for modifying a conduction factor of said second power transistor at each occurrence of changeover from said back current mode to said regenerative current mode and each occurrence of changeover from said regenerative current mode to said back current mode.

7. A generator control apparatus according to claim 6, wherein said conduction factor modification means performs said modification of said conduction factor to reduce an extent of variation of an average value of said drive voltage of said field winding.

8. A generator control apparatus according to claim 6, wherein said conduction factor modification means increases said conduction factor at each occurrence of changeover from said back current mode to said regenerative current mode and decreases said conduction factor at each occurrence of changeover from said regenerative current mode to said back current mode.

9. A generator control apparatus according to claim 8, wherein designating D1 as a value of said conduction factor immediately prior to a changeover from said back current mode to said regenerative current mode, and designating D2 as an updated value established for said conduction factor at to said changeover from said back current mode to said regenerative current mode, said conduction factor modification means performs said conduction factor modification at said changeover by utilizing a relationship:

$$D2=(D1+1)/2$$

and wherein designating D3 as a value of said conduction factor immediately prior to a changeover from said regenerative current mode to said back current mode, and designating D4 as an updated value established for said conduction factor at said changeover from said regenerative current mode to said back current mode, said conduction factor modification means performs said conduction factor modification at said changeover by utilizing a relationship:

$$D4=2\times D3-1.$$

10. A generator control apparatus according to claim 9, wherein said conduction factor modification means expresses a value of said conduction factor as n bits of data, where n is a fixed integer, and wherein said conduction factor modification means performs a bit shift operation on said n bits at each said changeover between said back current mode and regenerative current mode, and establishes an updated value for said conduction factor immediately subsequent to said changeover based upon a result of said bit shift operation.

11. A control apparatus for a vehicle-mounted electric generator, the electric generator including a field winding and the control apparatus including means for applying a drive voltage to said field winding and perform successive on/off switching of said drive voltage with a duty ratio that determines a level of output current produced from said electric generator, wherein said control apparatus comprises:
means for judging a currently available electric generating capacity of said electric generator;
means for selectively establishing a regenerative current mode of operation in which an induced current of said field winding of said electric generator augments said output current and a back current mode of operation in which said induced current does not augment said output current, in accordance with whether said electrical generating capacity is judged to be above a predetermined level; and
means for performing adjustment of an average value of said drive voltage, said adjustment being performed at each occurrence of a changeover between said regenerative current mode and said back current mode, with an amount and direction of said adjustment being respectively predetermined to suppress occurrence of a significant change in amplitude of said output current at said changeover.

* * * * *